(12) United States Patent
Azuhata et al.

(10) Patent No.: US 7,474,161 B2
(45) Date of Patent: Jan. 6, 2009

(54) CHARGE PUMP CIRCUIT

(75) Inventors: Satoshi Azuhata, Osaka (JP);
Toshinobu Nagasawa, Osaka (JP);
Tetsushi Toyooka, Kyoto (JP); Keiichi Fujii, Shiga (JP)

(73) Assignee: Panasonic Corporation, Osaka (JP)

( * ) Notice: Subject to any disclaimer, the term of this patent is extended or adjusted under 35 U.S.C. 154(b) by 53 days.

(21) Appl. No.: 11/484,775

(22) Filed: Jul. 12, 2006

(65) Prior Publication Data
US 2007/0013448 A1    Jan. 18, 2007

(30) Foreign Application Priority Data
Jul. 14, 2005    (JP)    ............... 2005-205513

(51) Int. Cl.
*H03B 1/00*    (2006.01)
(52) U.S. Cl. ............... 331/74; 331/16; 327/536; 363/60
(58) Field of Classification Search ............ 331/16, 331/74; 327/536; 363/60
See application file for complete search history.

(56) References Cited

U.S. PATENT DOCUMENTS

| | | | |
|---|---|---|---|
| 6,738,272 B2 | 5/2004 | Yamanaka et al. | |
| 6,788,039 B2 * | 9/2004 | Abdoulin | 323/288 |
| 7,239,192 B2 * | 7/2007 | Tailliet | 327/536 |

FOREIGN PATENT DOCUMENTS

JP    2003018822    1/2003

* cited by examiner

*Primary Examiner*—Arnold Kinkead
(74) *Attorney, Agent, or Firm*—Dickinson Wright, PLLC

(57) ABSTRACT

While a charge pump activation/deactivation control circuit is outputting a high level signal, MOS transistors for short-circuiting a flying capacitor are off, and the charge pump circuit operates normally. When the charge pump activation/deactivation control circuit outputs a low level signal, the MOS transistors for short-circuiting the flying capacitor are turned on, and the charge pump circuit is deactivated. Consequently, the voltages at the terminals of the flying capacitor are the same and the charge charged therein is discharged. Therefore, when the charge pump circuit is activated again, the initial amount of charge charged to the flying capacitor is zero. Consequently, no large current flows through an output capacitor in the first discharging cycle after the re-activation.

3 Claims, 10 Drawing Sheets

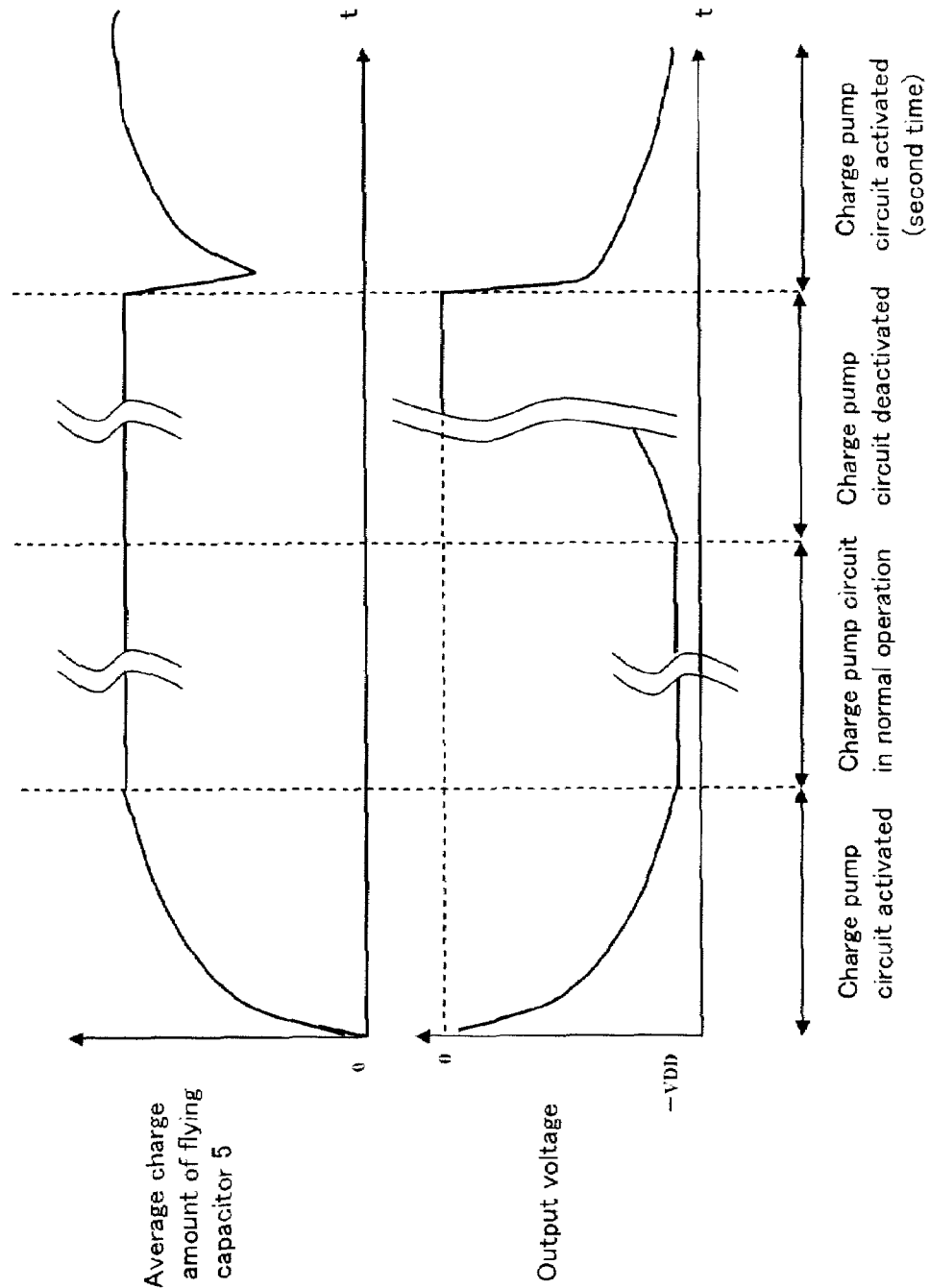

CHARGE PUMP CIRCUIT

BACKGROUND OF THE INVENTION

1. Field of the Invention

The present invention relates to a charge pump circuit which is a DC-DC converter of a charge pump type formed in a semiconductor integrated circuit.

2. Prior Art

In recent years, with the spread of portable electronic apparatuses required to save power, semiconductor integrated circuits used therefor have been required to be driven at a low power supply voltage. However, in semiconductor integrated circuits, there are cases where a voltage different from the power supply voltage is required for purposes such as the enhancement of the dynamic range. In such cases, a charge pump circuit is used as the circuit performing DC-DC voltage conversion.

In conventional charge pump circuits, the charge charged to the output capacitor at the time of activation is zero. For this reason, the output capacitor is rapidly charged, so that a large current flows momentarily and the output voltage changes abruptly.

In particular, when the output of a charge pump circuit is used as the negative power source in a semiconductor integrated circuit, since it is necessary that the substrate potential of the semiconductor integrated circuit be the lowest potential, the substrate is connected to the output of the charge pump circuit. Consequently, when the output of the charge pump circuit abruptly changes, the voltage change is transmitted to every part of the semiconductor integrated circuit through parasitic capacitance and this adversely affects the circuit operation.

Means for solving this problem is proposed in Japanese Laid-Open Patent Application No. 2003-18822. With reference to the circuit diagram of FIG. 6 showing the schematic structure of a charge pump circuit and the timing chart shown in FIG. 7, the operation of the charge pump circuit will be described. In FIG. 6, reference numerals 1 to 4 represent MOS transistors, reference numeral 5 represents a flying capacitor, reference numeral 6 represents an output capacitor, reference numeral 7 represents an oscillation circuit having the function of monitoring the output level and changing the duty ratio of the oscillation, reference numeral 9 represents the output terminal of the charge pump circuit, reference numeral 10 represents a dead time generation circuit, and reference numeral 11 represents a logic element formed of a NOT gate. FIG. 7 shows the changes, with time, of the gate input levels of the MOS transistors 1 to 4 from the time the charge pump circuit is activated to the time the output voltage is stabilized to effect a shift to the normal operation.

When the charge pump circuit is activated, a rectangular wave is outputted from the oscillation circuit 7, and the signals shown in FIG. 7 are inputted as the inputs to the gate terminals of the MOS transistors 1 to 4, respectively. By such signals being inputted, a cycle where the MOS transistors 1 and 2 are simultaneously turned on to charge the flying capacitor 5 and a cycle where the MOS transistors 3 and 4 are simultaneously turned on to discharge the flying capacitor 5 and charge the output capacitor 6 are alternately repeated. Then, the output level of the output terminal 9 is −VDD in the end.

At this time, in order that the MOS transistors 1 and 2 and the MOS transistors 3 and 4 are not simultaneously turned on, a dead time is added as the input signals to the gate terminals of the MOS transistors 3 and 4 by use of the dead time generation circuit 10.

In this series of steps, when the charge pump circuit is activated, the charge charged to the output capacitor 6 is zero as mentioned above. Therefore, if the flying capacitor 5 is completely charged in the cycle to charge the flying capacitor 5 at the first time, in the next cycle to discharge the flying capacitor 5, a large current flows through the output capacitor 6 to rapidly charge the output capacitor 6. Consequently, the output voltage level abruptly changes. To prevent this, at the oscillation circuit 7, the output voltage level is monitored and when the output voltage level is not less than a predetermined voltage, the duty ratio of the outputted rectangular wave is made low.

By performing control like this, the period during which the flying capacitor 5 is charged is reduced and this reduces the amount of charge charged to the flying capacitor 5 in one cycle, so that the amount of current flowing through the output capacitor 6 in the next discharging cycle is also reduced. Consequently, the drop in output voltage level is gentle. When the output voltage level becomes not more than a predetermined level, the oscillation circuit 7 increases the duty ratio of the rectangular wave to thereby ensure the charge supply capability for the output.

However, in the charge pump circuit proposed in Japanese Laid-Open Patent Application No. 2003-18822, no consideration is given to activating/deactivating the charge pump circuit other than when the power is turned on. In uses required to save power such as portable apparatuses, it is important to prevent loss of power by deactivating the charge pump circuit when it is not used.

To deactivate the charge pump circuit, in the charge pump circuit shown in FIG. 6, the MOS transistors 1 to 4 are all turned off by inputting a high level signal to the gate terminal of the MOS transistor 1 and inputting a low level signal to the gate terminals of the MOS transistors 2 to 4. However, in a case where the function of merely activating/deactivating the charge pump circuit as mentioned above is added to the charge pump circuit of FIG. 6, although the change in output voltage level is gentle when the charge pump circuit is activated for the first time, the output voltage level abruptly changes when the charge pump circuit is deactivated once and activated again.

This problem will be described with reference to FIG. 8. FIG. 8 is a circuit diagram in which the charge pump circuit activating/deactivating function is added to the above-described charge pump circuit shown in FIG. 6. FIG. 9 shows the changes, with time, of the gate input levels of the MOS transistors 1 to 4, and FIG. 10 is a view showing the changes, with time, of the average charge amount of the flying capacitor 5 and the output voltage. Elements corresponding to the elements described with reference to FIG. 6 and having equal functions are denoted by the same reference numerals, and overlapping descriptions thereof are omitted.

In FIG. 8, reference numeral 8 represents a charge pump activation/deactivation control circuit. When the charge pump activation/deactivation control circuit 8 outputs a high level signal, the charge pump circuit is activated, and when it outputs a low level signal, the charge pump circuit is deactivated. Reference numerals 12 and 15 represent logic elements formed of AND gates, and reference numerals 13 and 14 represent logic elements formed of NOT gates.

The operation from the time the charge pump circuit is activated for the first time to the time the output voltage is stabilized to effect a shift to the normal operation is similar to the above-described contents, and a high level signal is outputted from the charge pump activation/deactivation control circuit 8. When a low level signal is inputted from the charge pump activation/deactivation control circuit 8, a high level signal is inputted to the gate terminal of the MOS transistor 1 and a low level signal is inputted to the gate terminals of the MOS transistors 1 to 4, so that the MOS transistors 1 to 4 are all turned off to stop the operation of the charge pump circuit.

However, even though the operation of the charge pump circuit is stopped, the charge charged to the flying capacitor 5 is not discharged but maintained, and the voltage thereacross is VDD. When the charge pump circuit is activated again under this condition, a large current flows through the output capacitor 6 and the output voltage level abruptly changes as shown in FIG. 10. This is because the flying capacitor 5 is charged from the beginning, and even though the duty ratio of the rectangular wave outputted by the oscillation circuit 7 is low, a large current flows through the output capacitor 6 irrespective thereof. This phenomenon occurs every time the charge pump circuit is activated except when the charge pump circuit is activated for the first time.

SUMMARY OF THE INVENTION

The present invention solves the above-mentioned problem of the prior art, and an object thereof is to provide a charge pump circuit in which the output voltage level does not abruptly change when the charge pump circuit is deactivated once and activated again.

To attain the above-mentioned object, a charge pump circuit according to the present invention is provided with: a charging and discharging capacitor; an output capacitor; switching means for alternately repeating a state of accumulating a charge in the charging and discharging capacitor and a state of transferring the charge in the charging and discharging capacitor to the output capacitor; control means for controlling activation/deactivation of the switching operation of the switching means; and charge discharging means for discharging the charge remaining in the charging and discharging capacitor while the switching operation of the switching means is stopped.

According to this structure, since the charge discharging means is provided and the charge remaining in the charging and discharging capacitor is discharged while the switching operation of the switching means is stopped, when the charge pump circuit being activated once is deactivated and is activated again, the charge charged in the flying capacitor while the charge pump circuit is deactivated can be discharged, so that the abrupt change in output voltage level at the time of re-activation of the charge pump circuit can be prevented.

In the above-described structure, the switching means includes, for example, a first and second transistors that connect the one terminal and the another terminal of the charging and discharging capacitor to one terminal and another terminal of a power source that charges the charging and discharging capacitor, respectively, and a third and fourth transistors that connect the one terminal and the another terminal of the charging and discharging capacitor to one terminal and another terminal of the output capacitor, respectively.

Moreover, in the above-described structure, it is preferable that the charge discharging means include, for example, means for making potentials at the one terminal and the another terminal of the charging and discharging capacitor the same. Here, the means for making the potentials of the one terminal and the another terminal of the charging and discharging capacitor the same includes, for example, a fifth and sixth transistors that connect the one terminal and the another terminal of the charging and discharging capacitors to nodes of the same potential.

When the another terminal of the power source is connected to a ground node and the another terminal of the output capacitor is connected to the ground node, the second and fourth transistors may serve also as the means for making the potentials of the one terminal and the another terminal of the charging and discharging capacitor the same.

Moreover, in the above-described structure, it is preferable that an oscillation circuit that supplies a switching signal to the switching means be provided and the oscillation circuit change a duty ratio of the switching signal according to a change in a voltage that appears at the one terminal and the another terminal of the output capacitor.

Here, the "charging and discharging capacitor" is a capacitor that is generally called a flying capacitor; however, the present invention is not limited to this designation. It may be any capacitor that is included in charge pump circuits and charged and discharged to transfer a charge to the output capacitor.

According to the present invention, the abrupt change in output voltage level at the time of re-activation of the charge pump circuit can be prevented.

According to the present invention, the adverse effect on the circuit operation can be prevented also when the output of the charge pump circuit is connected to the semiconductor substrate.

BRIEF DESCRIPTION OF THE DRAWINGS

FIG. 10 is a view showing the changes, with time, of the average charge amount of the flying capacitor and the output voltage in the second prior art charge pump circuit.

DESCRIPTION OF THE PREFERRED EMBODIMENTS

Hereinafter, embodiments of the present invention will be described in detail with reference to the drawings.

Figure 1:
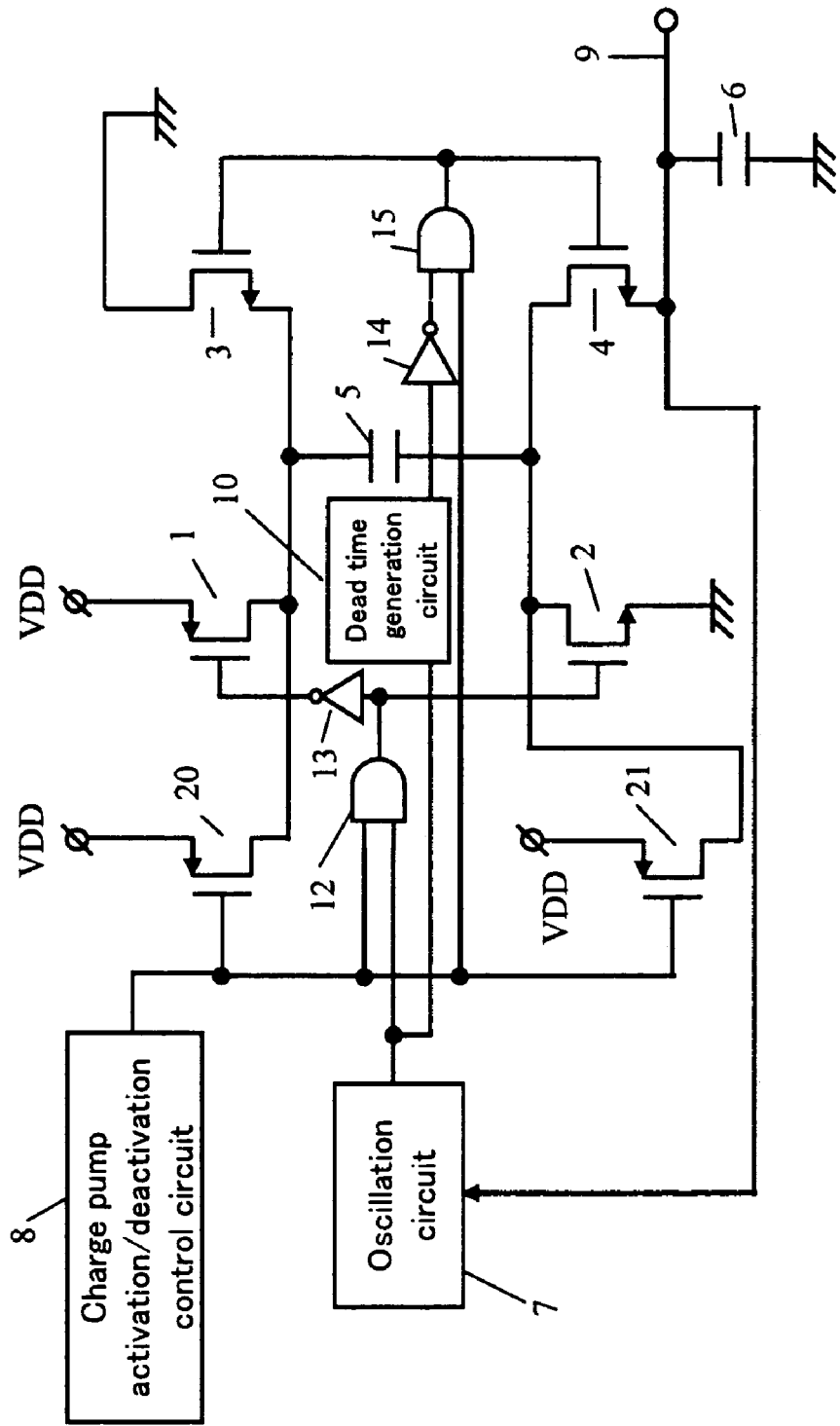
FIG. 1 is a circuit diagram showing the schematic structure of a charge pump circuit according to a first embodiment of the present invention.
Figure 8:
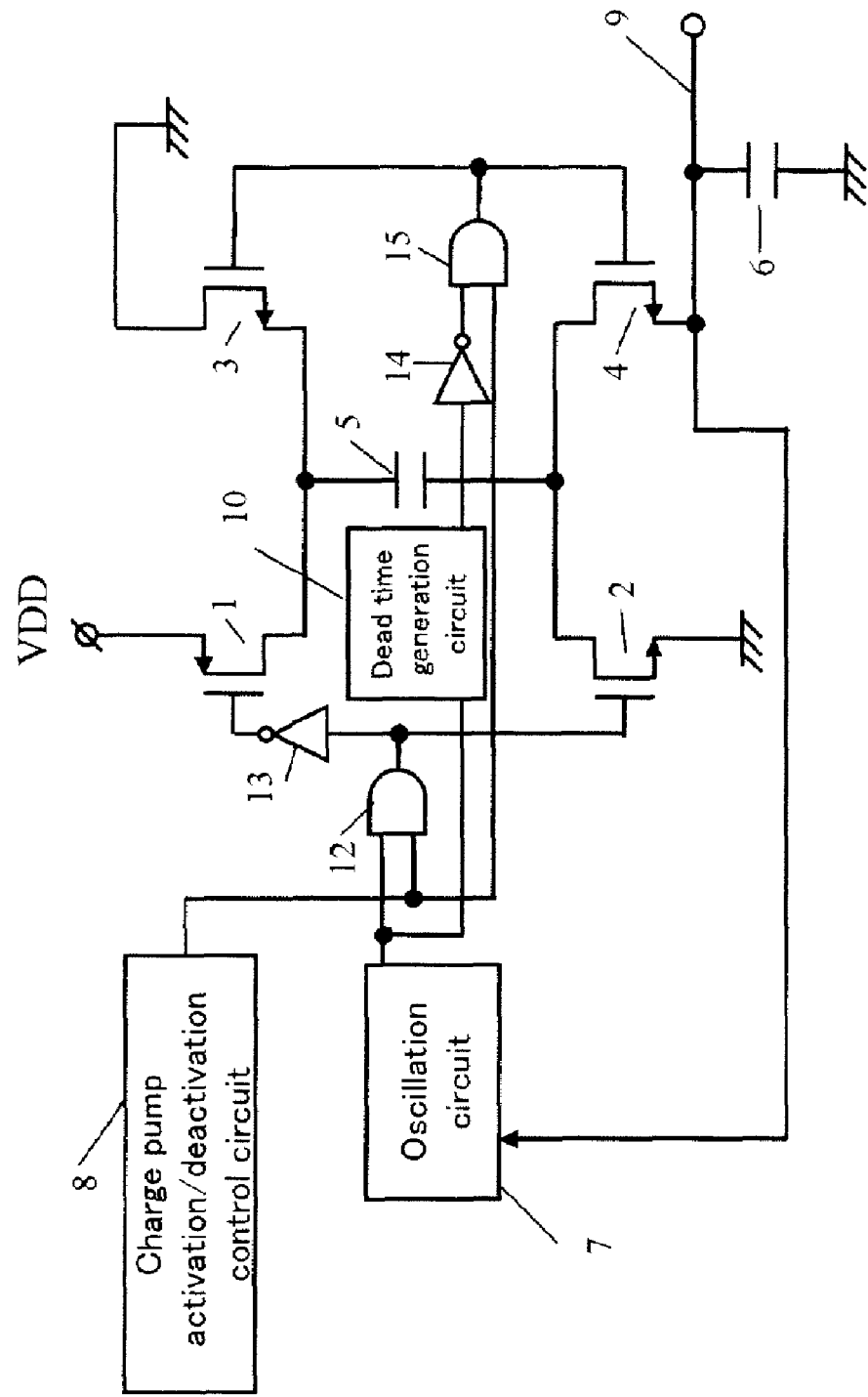
FIG. 8 is a circuit diagram showing the schematic structure of the second prior art charge pump circuit.
Figure 9:
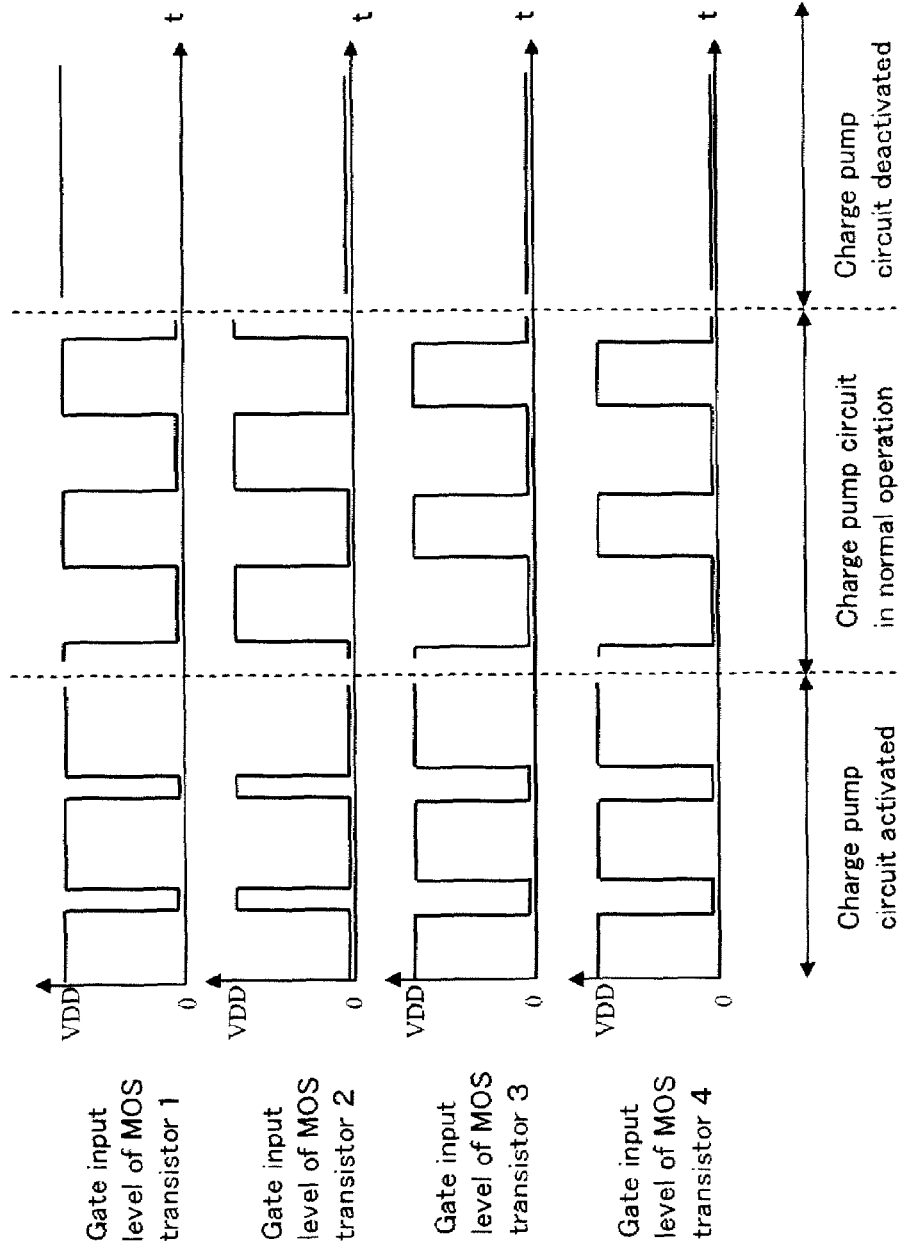
FIG. 9 is a timing chart showing the changes, with time, of the gate input levels of the MOS transistors in the second prior art charge pump circuit.

FIG. 1 is a circuit diagram showing the schematic structure of a charge pump circuit according to a first embodiment of the present invention. Here, elements corresponding to the elements described with reference to FIG. 8 showing the above-described conventional example and having substantially equal functions are denoted by the same reference numerals. This applies to the figures referred to below.

In FIG. 1, reference numerals 1 to 4 represent MOS transistors, reference numeral 5 represents a flying capacitor, reference numeral 6 represents an output capacitor, reference numeral 7 represents an oscillation circuit, reference numeral 8 represents a charge pump activation/deactivation control circuit, reference numeral 9 represents an output terminal, reference numeral 10 represents a dead time generation circuit, reference numerals 12 to 15 are logic elements, and reference numerals 20 and 21 represent MOS transistors.

Figure 2:
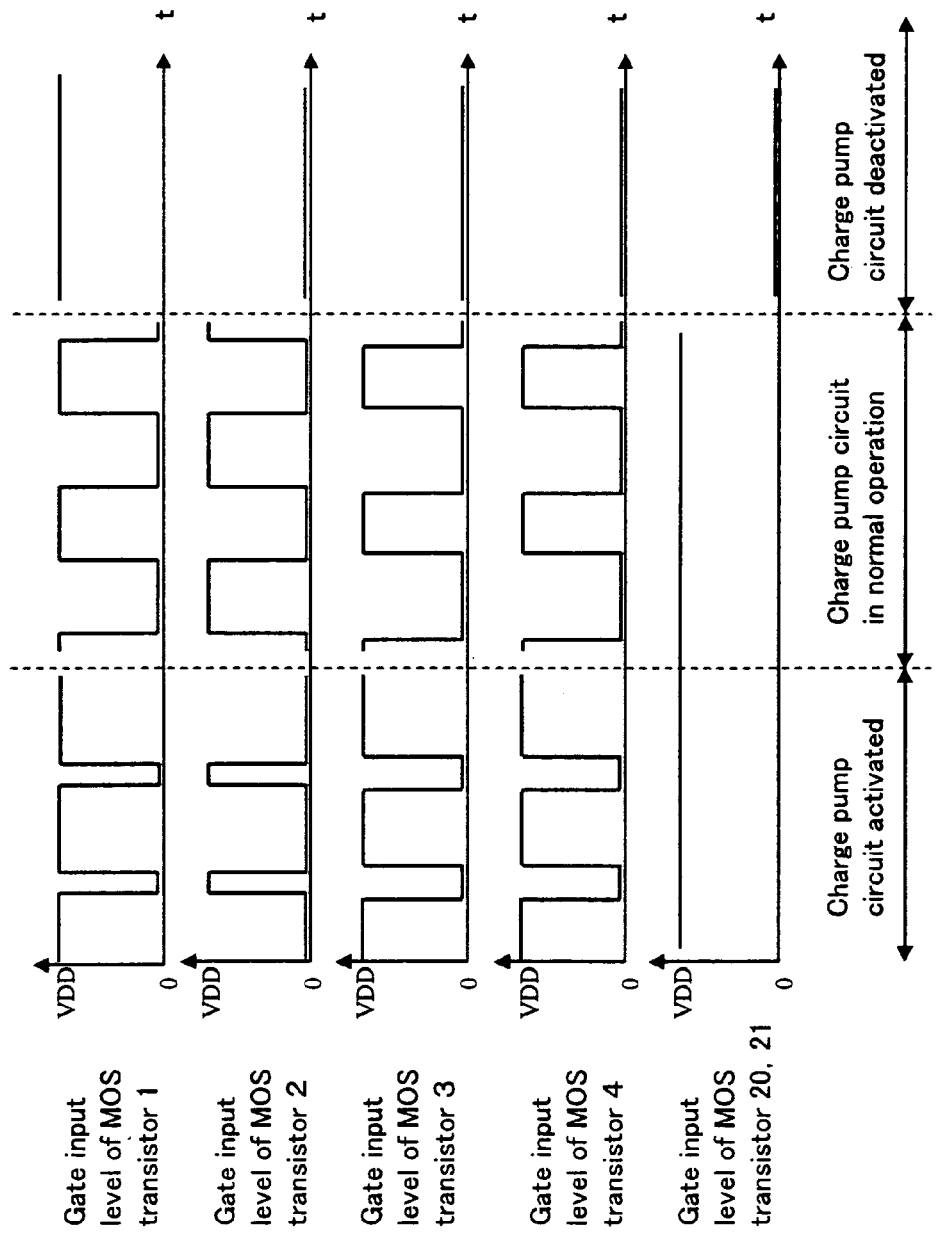
FIG. 2 is a timing chart showing the changes, with time, of the gate input levels of the MOS transistors in the first embodiment.
Figure 3:
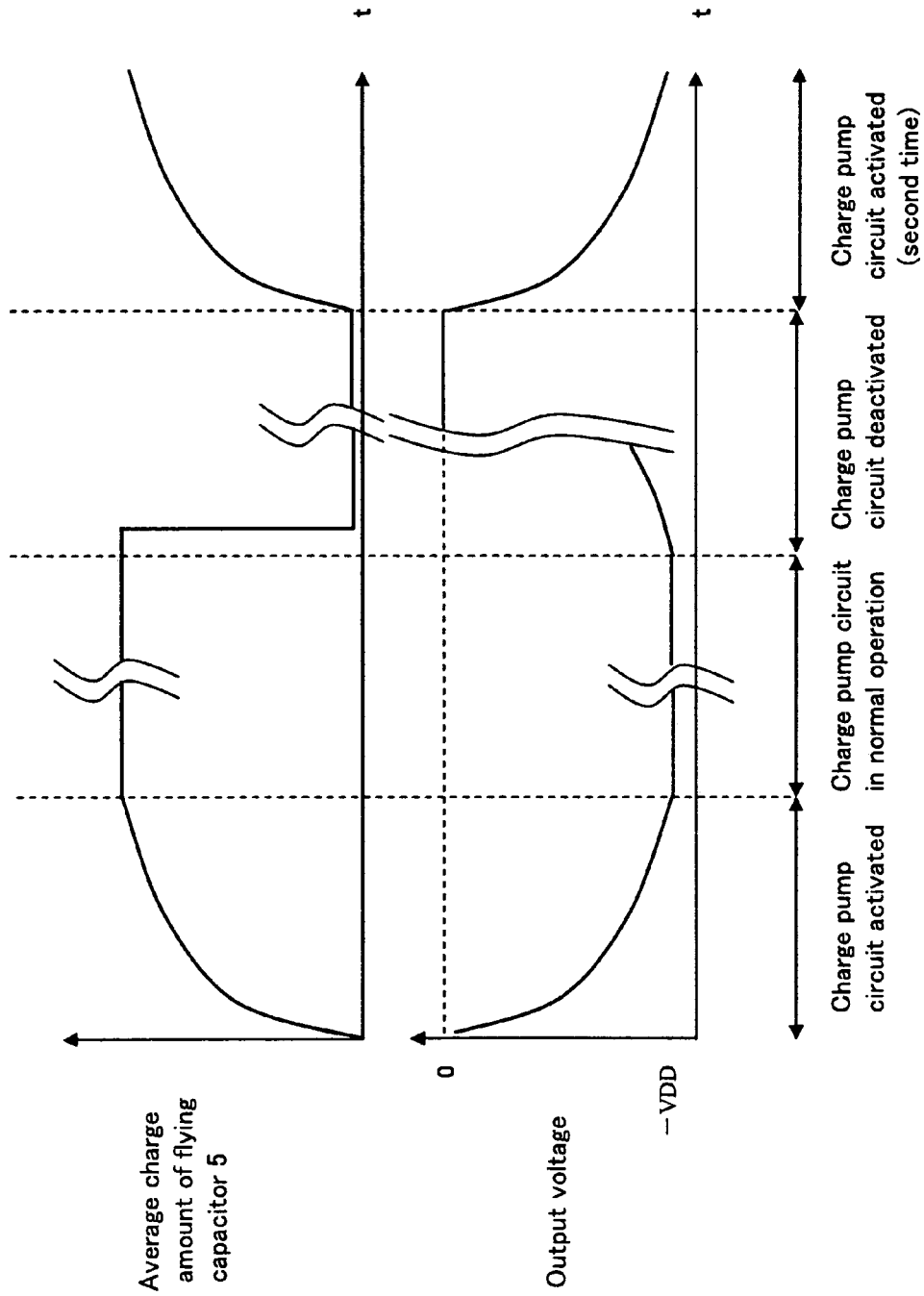
FIG. 3 is a view showing the changes, with time, of the average charge amount of a flying capacitor and the output voltage level in the first embodiment.

FIG. 2 is a timing chart showing the changes, with time, of the gate input levels of the MOS transistors 1 to 4, 20 and 21. FIG. 3 is a view showing the changes, with time, of the average charge amount of the flying capacitor 5 and the output voltage level.

The operation of the charge pump circuit according to the first embodiment will be described with reference to FIGS. 1 to 3. As shown in FIG. 1, the source terminals of the MOS transistors 20 and 21 are connected to the power source VDD, and the drain terminals thereof are connected to the terminals of the flying capacitor 5.

When the charge pump circuit is activated for the first time, the oscillation circuit 7 monitors the output terminal 9 of the charge pump circuit and performs control so that the duty ratio is low when the output voltage level of the charge pump circuit is not less than a predetermined level. Consequently, when the charge pump circuit is activated, the amount of charge charged in the cycle to charge the flying capacitor 5 is made small, and the change in output voltage is gentle.

Moreover, a dead time is added to the rectangular wave inputted to the gate terminals of the MOS transistors 3 and 4.

When the charge pump activation/deactivation control circuit 8 outputs a high level signal, like the conventional example, the charge pump circuit is activated. During this period, a high level signal is inputted to the gate terminals of the MOS transistors 20 and 21 from the charge pump activation/deactivation control circuit 8, so that the MOS transistors 20 and 21 are turned off and the rectangular wave outputted by the oscillation circuit 7 is not affected.

When the charge pump activation/deactivation control circuit 8 outputs a low level signal, a high level signal is inputted to the gate terminal of the MOS transistor 1 and a low level signal is inputted to the gate terminals of the MOS transistors 2, 3 and 4, so that the operation of the charge pump circuit is stopped. Simultaneously therewith, a low level signal is inputted to the gate terminals of the MOS transistors 20 and 21 from the charge pump activation/deactivation control circuit 8, so that the MOS transistors 20 and 21 are turned on. Consequently, the terminals of the flying capacitor 5 are connected to nodes of the same potential, that is, nodes of the potential VDD, so that the terminals of the flying capacitor 5 are short-circuited.

By performing control like this, the potentials of the terminals of the flying capacitor 5 equally become VDD simultaneously with the deactivation of the charge pump circuit, so that the charged charge is completely discharged.

Consequently, when the charge pump circuit is activated again, the initial amount of charge charged to the flying capacitor 5 is zero. For this reason, no large current flows through the output capacitor 6 in the first discharging cycle after the charge pump circuit is activated again, so that the abrupt change in output voltage can be prevented.

While in the first embodiment, as the circuit that prevents the abrupt change in output voltage at the time of activation of the charge pump circuit, the circuit that makes the duty ratio of the oscillation circuit 7 low is shown as an example, this part is not necessarily this circuit and may be replaced by a different circuit having an equal function. Moreover, while the flying capacitor 5 is discharged by turning on the MOS transistors 20 and 21 simultaneously with the deactivation of the charge pump circuit, the timing of discharging may be any time as long as it is while the charge pump circuit is deactivated.

Figure 4:
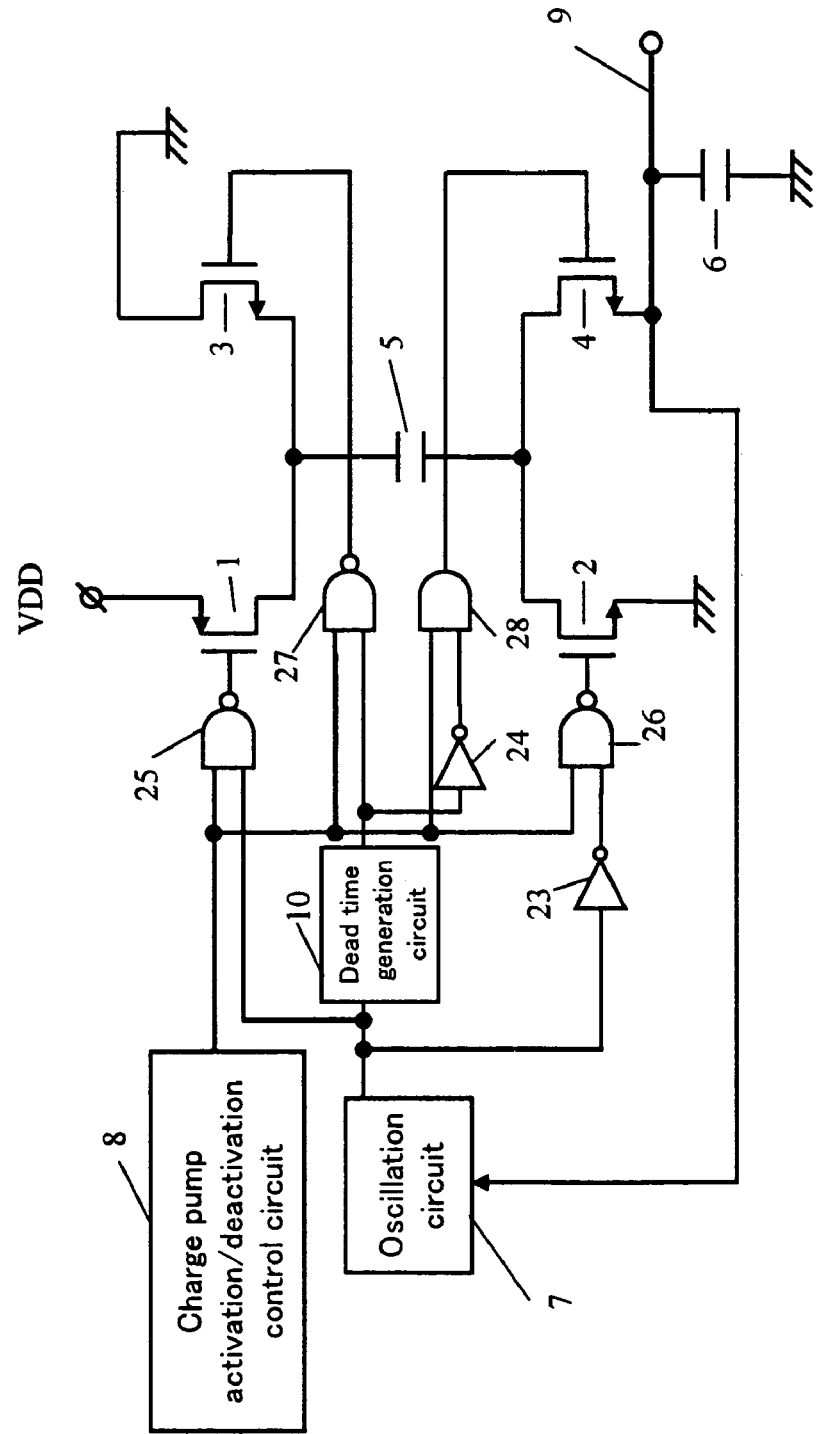
FIG. 4 is a circuit diagram showing the schematic structure of a charge pump circuit according to a second embodiment of the present invention.

FIG. 4 is a circuit diagram showing the schematic structure of a charge pump circuit according to a second embodiment of the present invention. In FIG. 4, reference numerals 1 to 4 represent MOS transistors, reference numeral 5 represents a flying capacitor, reference numeral 6 represents an output capacitor, reference numeral 7 represents an oscillation circuit, reference numeral 8 represents a charge pump activation/deactivation control circuit, reference numeral 9 represents an output terminal, reference numeral 10 represents a dead time generation circuit, reference numerals 23 and 24 represent logic elements formed of NOT gates, reference numerals 25, 26 and 27 represent logic elements formed of NAND gates, and reference numeral 28 represents a logic element formed of an AND gate.

Figure 5:
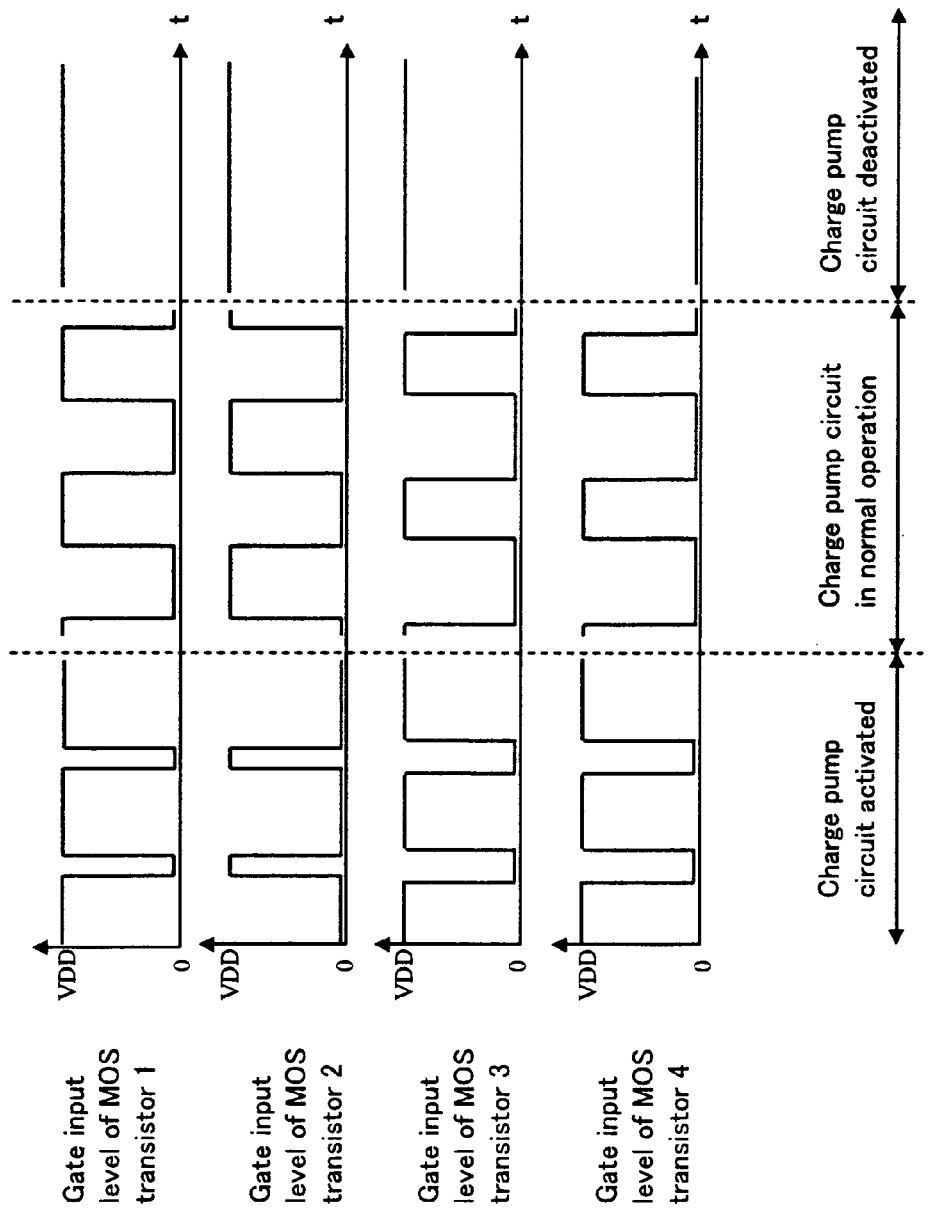
FIG. 5 is a timing chart showing the changes, with time, of the gate input levels of the MOS transistors in the second embodiment.
Figure 6:
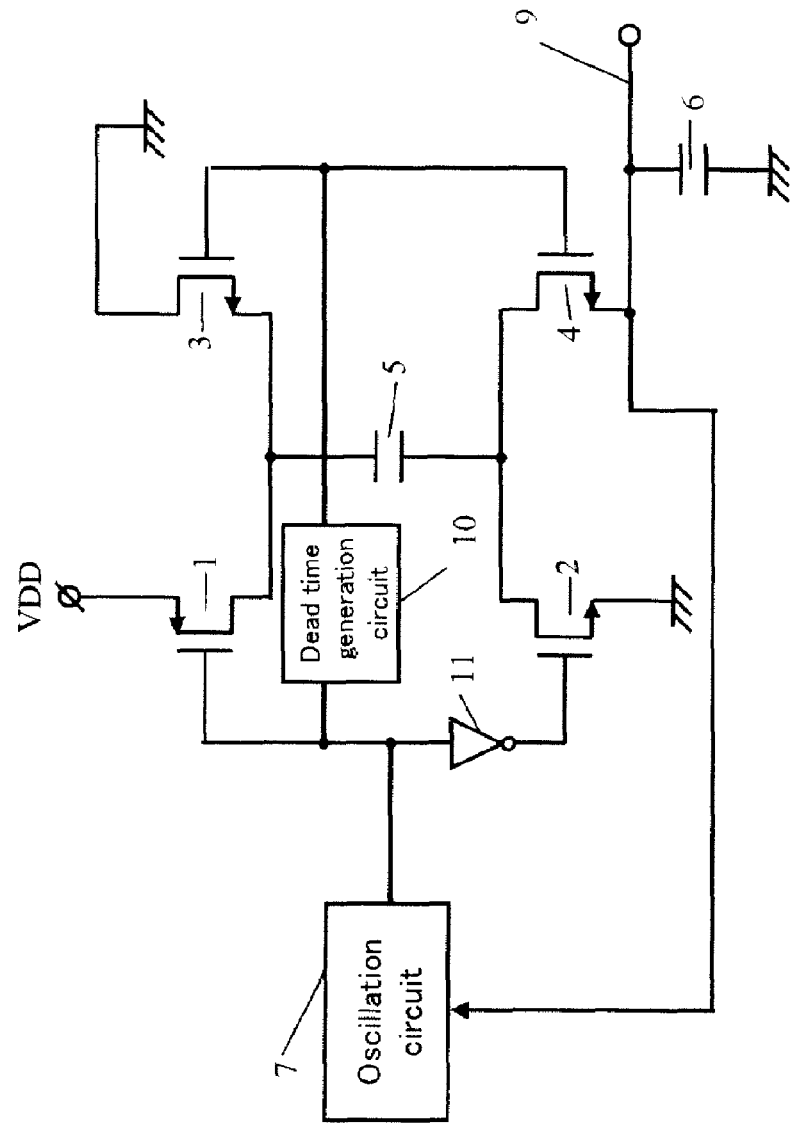
FIG. 6 is a circuit diagram showing the schematic structure of the prior art charge pump circuit.
Figure 7:
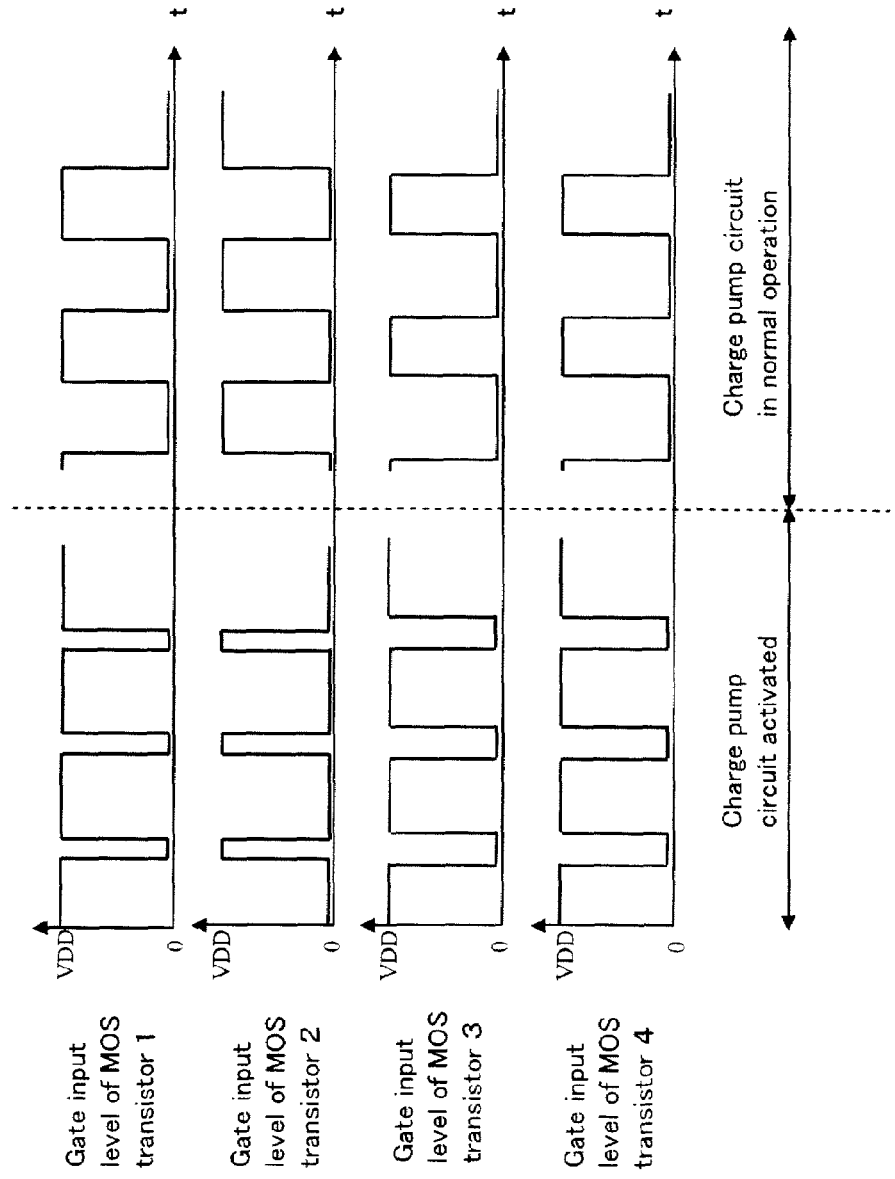
FIG. 7 is a timing chart showing the changes, with time, of the gate input levels of the MOS transistors in the prior art charge pump circuit.

FIG. 5 is a timing chart showing the changes, with time, of the gate input levels of the MOS transistors 1 to 4 shown in FIG. 4.

The second embodiment will be described with reference to FIGS. 4 and 5. The operation from the time the charge pump circuit is activated for the first time to the time the output voltage of the charge pump circuit is stabilized is similar to that of the above-described first embodiment.

When the charge pump activation/deactivation control circuit 8 outputs a low level signal, a low level signal is inputted to the gate terminal of the MOS transistor 4 and a high level signal is inputted to the gate terminals of the MOS transistors 1, 2 and 3, so that the charge pump circuit is deactivated. By performing control like this, although the MOS transistors 1 and 4 are turned off, the MOS transistors 2 and 3 are turned on. Consequently, the terminals of the flying capacitor 5 are connected to nodes of the same potential, that is, nodes of the GND level, so that the terminals of the flying capacitor are short-circuited. That is, the terminals of the flying capacitor are connected to the GND level, so that the charge charged to the flying capacitor 5 is completely discharged.

Thus, similar effects to those of the first embodiment can be obtained. While in the second embodiment, the inputs to the gate terminals of the MOS transistors 2 and 3 are made high simultaneously with the deactivation of the charge pump circuit, this timing may be any time as long as it is while the charge pump circuit is deactivated.

As described above, according to the first and second embodiments, when the charge pump circuit being activated once is deactivated and is activated again, by discharging the charge charged to the flying capacitor while the charge pump circuit is deactivated, the abrupt change in output voltage level at the time of activation of the charge pump circuit can be prevented, so that the adverse effect on the operation of the circuit connected to the semiconductor substrate can be prevented.

INDUSTRIAL APPLICABILITY

In the charge pump circuit according to the present invention, even when the charge pump circuit being activated once is deactivated and is activated again, the charge charged to the flying capacitor while the charge pump circuit is deactivated can be discharged, the abrupt change in output voltage level at the time of re-activation of the charge pump circuit is prevented, and even when the output of the charge pump circuit is connected to the semiconductor substrate, the adverse effect on the circuit operation can be prevented. Thus, the charge pump circuit according to the present invention is useful for semiconductor integrated circuits having a DC-DC converter of the charge pump type.

What is claimed is:

1. A charge pump circuit comprising:

a charging and discharging capacitor;

an output capacitor;

switching means for alternately repeating a state of accumulating a charge in the charging and discharging capacitor and a state of transferring the charge in the charging and discharging capacitor to the output capacitor;

control means for controlling activation/deactivation of the switching operation of the switching means; and charge discharging means for discharging the charge remaining in the charging and discharging capacitor while the switching operation of the switching means is stopped, wherein:

the charge discharging means comprises means for making potentials at one terminal and another terminal of the charging and discharging capacitor the same, the switching means includes: a first and second transistors that connect the one terminal and the another terminal of the charging and discharging capacitor to one terminal and the another terminal of a power source that charges the charging and discharging capacitor, respectively; and a third and fourth transistors that connect the one terminal and the another terminal of the charging and discharging capacitor to one terminal and another terminal of the output capacitor, respectively, and the means for making the potentials of the one terminal and the another terminal of the charging and discharging capacitor the same comprises a fifth and sixth transistors that connect the one terminal and the another terminal of the charging and discharging capacitors to nodes of the same potential.

2. A charge pump circuit comprising:

a charging and discharging capacitor;

an output capacitor;

switching means for alternately repeating a state of accumulating a charge in the charging and discharging capacitor and a state of transferring the charge in the charging and discharging capacitor to the output capacitor;

control means for controlling activation/deactivation of the switching operation of the switching means; and charge discharging means for discharging the charge remaining in the charging and discharging capacitor while the switching operation of the switching means is stopped, wherein:

the charge discharging means comprises means for making potentials at one terminal and another terminal of the charging and discharging capacitor the same, the switching means includes: a first and second transistors that connect the one terminal and the another terminal of the charging and discharging capacitor to one terminal and another terminal of a power source that charges the charging and discharging capacitor, respectively; and a third and fourth transistors that connect the one terminal and the another terminal of the charging and discharging capacitor to one terminal and another terminal of the output capacitor, respectively, the another terminal of the power source is connected to a ground node, and the another terminal of the output capacitor is connected to the ground node, and the second and fourth transistors serve also as the means for making the potentials of the one terminal and the another terminal of the charging and discharging capacitor the same.

3. A charge pump circuit comprising:

a charging and discharging capacitor;

an output capacitor;

switching means for alternately repeating a state of accumulating a charge in the charging and discharging capacitor and a state of transferring the charge in the charging and discharging capacitor to the output capacitor;

control means for controlling activation/deactivation of the switching operation of the switching means; and charge discharging means for discharging the charge remaining in the charging and discharging capacitor while the switching operation of the switching means is stopped, wherein an oscillation circuit that supplies a switching signal to the switching means is provided, and the oscillation circuit changes a duty ratio of the switching signal according to a change in a voltage that appears at one terminal and another terminal of the output capacitor.

* * * * *